US010528986B2

(12) United States Patent
Seljan et al.

(10) Patent No.: US 10,528,986 B2
(45) Date of Patent: Jan. 7, 2020

(54) MODIFYING BID PRICE FOR ONLINE ADVERTISING AUCTION BASED ON USER IMPRESSION FREQUENCY

(71) Applicant: XANDR INC., New York, NY (US)

(72) Inventors: Samuel Sierra Seljan, Portland, OR (US); Arel Ives Lidow, New York, NY (US)

(73) Assignee: Xandr Inc., New York, NY (US)

( * ) Notice: Subject to any disclaimer, the term of this patent is extended or adjusted under 35 U.S.C. 154(b) by 32 days.

(21) Appl. No.: 14/597,715

(22) Filed: Jan. 15, 2015

(65) Prior Publication Data

US 2016/0210671 A1 Jul. 21, 2016

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
CPC .................. G06Q 30/0275; G06Q 30/0277
USPC ...... 705/14.42, 14.46, 14.71, 14.66; 709/203
See application file for complete search history.

(56) References Cited

U.S. PATENT DOCUMENTS

| 5,855,008 A | 12/1998 | Goldhaber et al. |
| 5,974,398 A | 10/1999 | Hanson et al. |
| 6,266,651 B1 | 7/2001 | Woolston |
| 6,285,987 B1 | 9/2001 | Roth et al. |
| 6,324,519 B1 | 11/2001 | Eldering |

(Continued)

FOREIGN PATENT DOCUMENTS

| EP | 1262891 A1 | 12/2002 |
| KR | 20020040222 A * | 5/2002 |

(Continued)

OTHER PUBLICATIONS

Jun Wang, Display Advertising With Real-Time Bidding and Behavioral Targeting, 2017 (Year: 2017).*

(Continued)

*Primary Examiner* — Tarek Elchanti
(74) *Attorney, Agent, or Firm* — Guntin & Gust, PLC; Atanu Das

(57) ABSTRACT

Methods, systems, and apparatus, including computer programs encoded on a computer storage medium, for receiving, from a client device of a user, a notification of an available ad space in a user interface of an application executing on the client device, identifying one or more advertising elements, each advertising element representing a respective buyer and comprising a respective bid price, one or more respective campaigns, and one or more respective creative elements, for a particular advertising element having a bid price based on, at least in part, past revenue generated from the buyer, determining an impression frequency from one or more of the creative elements of the particular advertising element, and adjusting the particular advertising element's bid price based on the impression frequency, after adjusting the particular advertising element's bid price, ranking the advertising elements based on, at least in part, the respective bid prices, and for a top-ranked advertising element, identifying a first creative element of the top-ranked advertising element, and sending the first creative element to the client device.

21 Claims, 4 Drawing Sheets

(56) References Cited

U.S. PATENT DOCUMENTS

| | | | |
|---|---|---|---|
| 6,760,916 | B2 | 7/2004 | Holtz et al. |
| 7,231,358 | B2 | 6/2007 | Singh et al. |
| 7,676,405 | B2 | 3/2010 | Steelberg et al. |
| 7,761,346 | B2 | 7/2010 | Cooper et al. |
| 7,870,023 | B2 | 1/2011 | Ozer et al. |
| 8,099,326 | B2 | 1/2012 | Steelberg et al. |
| 8,135,626 | B2 | 3/2012 | Das et al. |
| 8,175,914 | B1 | 5/2012 | Benson et al. |
| 8,224,698 | B2 | 7/2012 | Libby et al. |
| 8,788,364 | B1 | 7/2014 | Milgrom et al. |
| 2002/0169760 | A1 | 11/2002 | Cheung et al. |
| 2003/0046161 | A1 | 3/2003 | Kamangar et al. |
| 2003/0110171 | A1 | 6/2003 | Ozer et al. |
| 2004/0103024 | A1 | 5/2004 | Patel et al. |
| 2005/0251444 | A1 | 11/2005 | Varian et al. |
| 2006/0069621 | A1 | 3/2006 | Chang et al. |
| 2006/0224496 | A1 | 10/2006 | Sandholm et al. |
| 2007/0027765 | A1 | 2/2007 | Collins et al. |
| 2007/0073584 | A1 | 3/2007 | Grouf et al. |
| 2007/0130005 | A1 | 6/2007 | Jaschke |
| 2007/0179849 | A1 | 8/2007 | Jain |
| 2007/0233566 | A1 | 10/2007 | Zlotin et al. |
| 2007/0288350 | A1 | 12/2007 | Bykowsky |
| 2008/0097838 | A1 | 4/2008 | Lin et al. |
| 2008/0162329 | A1 | 7/2008 | Knapp et al. |
| 2008/0167924 | A1 | 7/2008 | Veach |
| 2008/0228564 | A1 | 9/2008 | de Heer et al. |
| 2008/0262917 | A1 | 10/2008 | Green et al. |
| 2008/0275757 | A1 | 11/2008 | Sharma et al. |
| 2009/0030788 | A1 | 1/2009 | Boudah et al. |
| 2009/0210287 | A1 | 8/2009 | Chickering et al. |
| 2009/0248541 | A1 | 10/2009 | Asher et al. |
| 2009/0307604 | A1 | 12/2009 | Giles et al. |
| 2010/0017287 | A1 | 1/2010 | Caldwell et al. |
| 2010/0049695 | A2 | 2/2010 | Morsa |
| 2010/0057556 | A1 | 3/2010 | Rousso et al. |
| 2010/0082433 | A1 | 4/2010 | Zhou et al. |
| 2010/0145809 | A1 | 6/2010 | Knapp et al. |
| 2011/0015990 | A1 | 1/2011 | Sanghavi |
| 2011/0035276 | A1* | 2/2011 | Ghosh ............... G06Q 30/02 705/14.46 |
| 2011/0040612 | A1 | 2/2011 | Simmons et al. |
| 2011/0040613 | A1 | 2/2011 | Simmons et al. |
| 2011/0161157 | A1 | 6/2011 | Nam et al. |
| 2011/0231242 | A1 | 9/2011 | Dilling |
| 2012/0158490 | A1 | 6/2012 | Neumeyer et al. |
| 2012/0253945 | A1* | 10/2012 | Gao ............... G06Q 30/0275 705/14.71 |
| 2014/0164137 | A1* | 6/2014 | Mathur ............ G06Q 30/0275 705/14.66 |
| 2015/0161282 | A1* | 6/2015 | Low ............... G06F 17/30887 709/203 |
| 2015/0339704 | A1* | 11/2015 | Liu ............... G06Q 30/0247 705/14.46 |
| 2016/0148276 | A1* | 5/2016 | O'Kelley ......... G06Q 30/0243 705/14.42 |

FOREIGN PATENT DOCUMENTS

| | | |
|---|---|---|
| WO | WO-01/35291 A2 | 5/2001 |
| WO | WO-2006/096768 A2 | 9/2006 |
| WO | WO-2008/077078 A1 | 6/2008 |

OTHER PUBLICATIONS

U.S. Appl. No. 12/717,990, filed Mar. 5, 2010, Advertising Platform User Data Store Management, Nolet et al.
U.S. Appl. No. 12/717,996, filed Mar. 5, 2010, Advertising Platform Creative Approval, Nolet et al.
U.S. Appl. No. 12/718,000, filed Mar. 5, 2010, Advertising Platform Transaction Management, Nolet et al.
U.S. Appl. No. 13/049,534, filed Mar. 16, 2011, Advertising Bid Price Modifiers, Dilling et al.
U.S. Appl. No. 13/049,579, filed Mar. 16, 2011, Advertising Venues and Optimization, Dilling et al.
U.S. Appl. No. 13/049,482, filed Mar. 16, 2011, Cross Platform Impression Inventory Classification, Crawford et al.
U.S. Appl. No. 13/561,855, filed Jul. 30, 2012, Targeted Learning in Online Advertising Auction Exchanges, Dalto et al.
U.S. Appl. No. 14/213,754, filed Mar. 14, 2014, Learn Budgeting in Online Advertising Auction Exchanges, Dalto.
U.S. Appl. No. 13/538,514, filed Jun. 29, 2012, Auction Tiering in Online Advertising Auction Exchanges, Collette et al.
U.S. Appl. No. 13/907,578, filed May 31, 2013, Application Marketplace for Online Advertising Applications, Avery et al.
U.S. Appl. No. 13/907,580, filed May 31, 2013, Application Marketplace for Online Advertising Applications, Maag.
U.S. Appl. No. 13/631,984, filed Sep. 29, 2012, Systems and Methods for Serving Secure Content, Cabral et al.
U.S. Appl. No. 14/181,237, filed Feb. 14, 2014, Systems and Methods for Privacy-Safe User Tracking, Haies et al.
U.S. Appl. No. 14/213,799, filed Mar. 14, 2014, System and Method for Applying Targeting Audience Bid Modifiers, Himrod et al.
U.S. Appl. No. 14/266,035, filed Apr. 30, 2014, Methods and Systems for Tracking Consumers Without Server-Side Profiling, Haies et al.
U.S. Appl. No. 14/295,652, filed Jun. 4, 2014, Method and System for Impression Inventory Trading, Anderson et al.
U.S. Appl. No. 14/554,976, filed Nov. 26, 2014, Selecting Bids for Online Adverting Space Auction, O'Kelley et al.
U.S. Appl. No. 14/561,615, filed Dec. 5, 2014, Modulating Budget Spending Pace for Online Advertising Auction by Adjusting Bid Prices, O'Kelley et al.
Search Report Under Section 17: United Kingdom Application No. 1003744.8, filed Mar. 5, 2010; 1 pg.
"AppNexus Delivers Data Warehouse Cloud Service Based on Netezza," accessed on the internet at 'http://www.netezza.com/releases/2009/release020209.htm; Press Release; Feb. 2, 2009; downloaded Apr. 7, 2014; 2pgs.
International Search Report and Written Opinion for International Patent Application No. PCT/US2011/028600 dated Jul. 20, 2011 ; 11 pgs.
International Search Report and Written Opinion for International Patent Application No. PCT/US2013/048570 dated Dec. 9, 2014; 9pgs.
International Search Report and Written Opinion for International Patent Application No. PCT/US2013/052715 dated Apr. 14, 2014; 14pgs.
Supplementary European Search: European Application No. EP11756897; dated Jan. 22, 2014; 2pgs.

* cited by examiner

US 10,528,986 B2

MODIFYING BID PRICE FOR ONLINE ADVERTISING AUCTION BASED ON USER IMPRESSION FREQUENCY

BACKGROUND

This specification relates to advertising and, in particular, optimizing bid prices for online advertising auctions.

Online display advertising delivers promotional messages to consumers by using visual advertisements (or "ads") in web pages. A publisher of a web page can insert an ad space in the web page. When the web page is displayed in a browser, a visual advertisement (a "creative") of an advertiser can be dynamically retrieved from an ad server for the advertiser, and displayed in the ad space. The act of displaying or serving a creative on a web page is often referred to as an impression.

An ad inventory is a collection of one or more ad spaces on web pages served by a publisher's web sites. Publisher can sell their ad inventories to advertisers. Multiple publishers and multiple advertisers can participate in auctions in which selling and buying of ad inventories take place. Auctions can be conducted by an ad network or ad exchange that brokers between a group of publishers and a group of advertisers.

Selling and buying ad spaces can be based on pricing or payment models such as cost per thousand impressions (CPM), cost per click (CPC), and cost per action or acquisition (CPA). In the CPM model, advertisers typically pay for every impression of their advertisement, the price paid for each impression is measured in price per 1000 ("mille") impressions. In the CPC model, advertisers typically pay each time a viewer clicks on their advertisement. In the CPA model, advertisers pay for every action, such as a sale or registration, completed as a result of a viewer clicking on their advertisement.

SUMMARY

In general, one aspect of the subject matter described in this specification can be embodied in methods that include the actions of receiving, from a client device of a user, a notification of an available ad space in a user interface of an application executing on the client device, identifying one or more advertising elements, each advertising element representing a respective buyer and comprising a respective bid price, one or more respective campaigns, and one or more respective creative elements, for a particular advertising element having a bid price based on, at least in part, past revenue generated from the buyer, determining an impression frequency from one or more of the creative elements of the particular advertising element, and adjusting the particular advertising element's bid price based on the impression frequency, after adjusting the particular advertising element's bid price, ranking the advertising elements based on, at least in part, the respective bid prices, and for a top-ranked advertising element, identifying a first creative element of the top-ranked advertising element, and sending the first creative element to the client device. Receiving, identifying, determining, adjusting, ranking, and sending can be performed by one or more computer processors. Other embodiments of this aspect include corresponding systems, apparatus, and computer programs.

These and other aspects can optionally include one or more of the following features. Sending the first creative element to the client device can cause the application to display the first creative element in the ad space. The first creative element can cause the application to retrieve, from a remote server system of the buyer, a second creative element and display the second creative element in the ad space. The first creative element can comprise JavaScript Object Notation (JSON) code. The first creative element can comprise a Uniform Resource Locator (URL) of the remote server of the buyer. Identifying a first creative element of the top-ranked advertising element can comprise retrieving the first creative element from a remote server system of the buyer. If a first creative element is not identified for the top-ranked advertising element, the aspect can comprise identifying, for a next top-ranked advertising element, a first creative element of the next top-ranked advertising element and sending the first creative element to the user's client device.

Particular implementations of the subject matter described in this specification can be implemented to realize one or more of the following advantages. The system described herein receives a notification of an available ad space associated with a user. The system identifies one or more advertising elements, each representing a respective buyer and comprising a respective bid price. For a particular advertising element having a bid price based on, at least in part, past revenue generated from the buyer, the system adjusts the particular advertising element's bid price based on an impression frequency of the user. The adjustment can model the user's tendency of less engagement with the buyer's advertising when exposed to the buyer's advertising for multiple times during a short period of time. After adjusting the particular advertising's bid price, the system ranks the advertising elements based on, at least in part, the respective bid prices. The system can identify a creative of a top-ranked advertising element and cause the creative to be displayed in the ad space.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
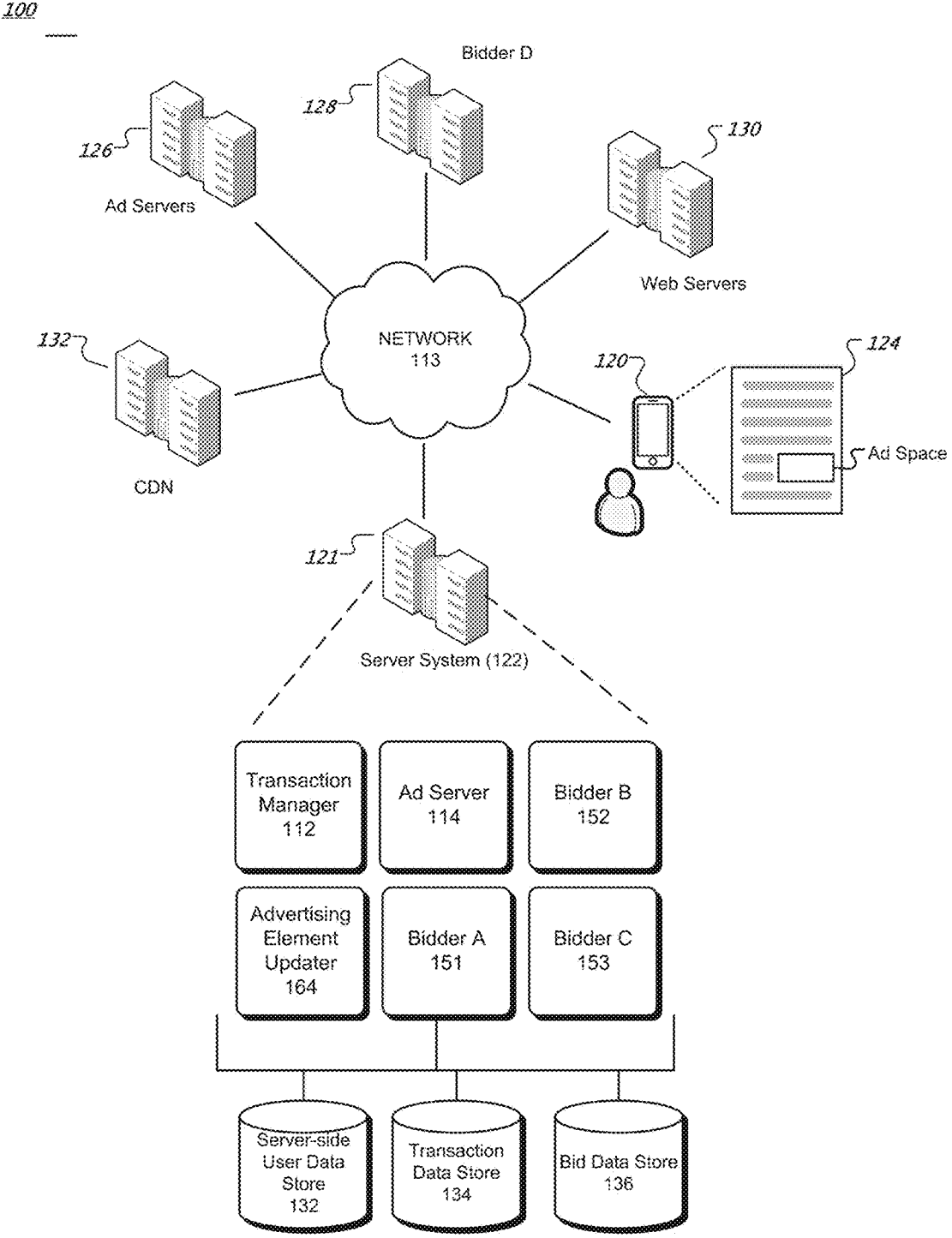
FIG. 1 illustrates an example system for adjusting bid prices for display advertising auctions based on user impression frequency.

FIG. 1 illustrates an example system for adjusting bid prices for display advertising auctions based on user impression frequency. A server system 122 provides functionality for adjusting bid prices for display advertising auctions. The server system 122 comprises software components and databases that can be deployed at one or more data centers 121 in one or more geographic locations, for example. The server system 122 software components comprise a transaction manager 112, ad server 114, advertising element updater 164, and one or more bidders (e.g., bidder A 151, bidder B 152, bidder C 153). The server system 122 can also include one or more software components for load balancing tools and security tools. The load balancing tools manage traffic within a single data center or between multiple data centers. The security tools manage data protection and access privilege for tenants served by the data centers 121. The software components can comprise subcomponents that can execute on the same or on different individual data processing apparatus. The server system 122 databases comprise a server-side user data store database 132, transaction data store database 134, and bid data store database 136. The databases can reside in one or more physical storage systems. The software components and data will be further described below.

The transaction manager 112 ("impression bus" or simply "Imp Bus") is a software component that facilitates the transaction aspects of ad inventory trading between buyers and sellers. A buyer can be an advertiser (e.g., Visa Inc., Adidas AG), an ad network (e.g., DoubleClick of Google, Inc., Bing Ads of Microsoft Corporation, Mojiva, InMobi), or an advertising agency (e.g., OMG National). Other buyers are possible. A seller can be a publisher (e.g., The Washington Post, CNBC, Facebook), an online streaming or gaming service (e.g., Hulu, Xbox Live of Microsoft Corporation), or an ad network. Other sellers are possible. The transaction manager 112 processes ad requests received from browsers or applications displaying content from publishers, feeds data to advertisers, conducts auctions (e.g., on behalf of sellers), returns creatives to the browsers, keeps track of billing and usage for advertisers and publishers, returns auction-result data, and enforces quality standards, for example. The transaction manager 112 stores in the transaction data store database 134 various transaction information for each and every ad space that is transacted by the transaction manager 112 or other software components of the server system 122.

The ad server 114 is a software component that serves ads or creatives to web pages. The ad server 114 can also make decisions about what ads to be served, track clicks on ads and other data, for example.

A bidder (e.g., bidder A 151) is a software component that, on behalf of a buyer, performs bidding operations. The bidder takes various pieces of bid-specific information (e.g., maximal bid price, target user areas or segments, start and end dates, budget) as input and generates a bid for a particular item of an ad inventory, for example. The bidder may store bid-specific information in bid data store database 136.

The transaction manager 112 can conduct an auction when receiving an ad request for filling an available ad space. By way of illustration, a user interface 124 of an application executing on a user's client device 120 can include an ad space and a corresponding ad tag. For instance, a web page displayed in a browser window of a web browser (e.g., running on a personal computer) can include an ad space on the web page and a corresponding ad tag. A user interface of an application running on a mobile device or a mobile application (e.g., an instant messaging application running on a smartphone) can include an ad space at the bottom of the user interface (a "banner ad") with a corresponding ad tag. Other examples of ad spaces are possible. Here, the user's client device 120 can be a mobile phone, a smartwatch, a tablet computer, a personal computer, a game console, or an in-car media system. Other examples of a client device are possible.

The ad tag can include a Uniform Resource Locator (URL) from which an ad will be requested (e.g., a URL for the server system 122), and HyperText Markup Language (HTML) or JavaScript codes for instructing a browser how to display the ad (e.g., displaying the ad in a 160×600 iframe). In some implementations, the ad tag can be provided by codes of a software development kit (SDK) embedded in the application. The software development kit can be provided by the server system 122 or an ad network, for example. The application running on the user's client device 124 can retrieve content in the user interface 124 such as a web page through one or more data communication networks 113 such as the Internet, for example, from a web servers 130 of a publisher. In addition, the ad tag causes the application to send (e.g., through the networks 113) a notification or an ad request to the server system 122. The ad request can include information about the available ad space (e.g., a size for the ad space, an identifier for the publisher), user information (e.g., an identifier of the user, an IP address), and system information (e.g., types of the browser and the client device), for example.

In response to the ad request, the transaction manager 112 can access a server-side user data store database 132 based on the user's identifier (if available), and retrieve available information about the user (e.g., user segment information such as age, gender, interests, or location). The transaction manager 112 generates a bid request including information about, the ad space, the user, and so on, and sends the bid request to multiple bidders such as bidder A 151 and bidder B 152. The transaction manager 112 can also send the bid request through the networks 113 to servers of bidder D 128, which is external to the server system 122.

Each bidder can base on its own requirement (e.g., budget, targets in placements or user demographics) and submits a bid response including a bid price and an identifier of a creative to be served, for example, to the transaction manager 112 (or not to respond at all). The transaction manager 112 determines a winning bid (e.g., a highest bid) among bid responses received within a specified time period (e.g., 10 milliseconds). The transaction manager 112 then returns a creative of the winning bid to the user's client device 120, causing the application to display the creative in the ad space in the user interface 124. The transaction manager 112 can also return a URL, for a creative of the winning bid to the user's client device 120, causing the application to retrieve the creative from an ad server (e.g., ad server 114, or ad servers 126 external to the server system 122), or from servers of a content distribution network (CDN) 132. In some implementations, the URL for the creative of the winning bid points to an ad server of a particular ad network, The URL can be returned to the user's client device 124 in JavaScript Object Notation (JSON) codes (e.g., in a JSON "container"). Codes of an SDK of the particular ad network (e.g., embedded in the application) can interpret the JSON codes and retrieve the creative from the particular ad network's ad server based on the URL in the JSON codes.

In addition, the transaction manager 122 can store in the transaction data store 134 transaction information such as an identifier of the creative served to the user, an identifier of the winning buyer, the user's identifier, the winning bid price, and a time stamp. Other transaction information of a transaction is possible.

The advertising element updater 164 is a software component that identifies a plurality of advertising elements that will bid on ad spaces. An advertising element or line item includes one or more advertising campaigns for an ad buyer such as an advertiser or an ad network. A line item can represent a buyer for bidding on ad spaces. A line item can be a financial agreement with a buyer that includes effective start and end dates ("flight dates") and a budget (e.g., lifetime budget, daily budget). A line item can also include performance goals (e.g., based on CPM or CPA payment model) that can be used to determine whether or not to bid on an ad inventory. A line item can also include one or more conversion pixels that are used to track revenue or performance goals. A line item can also include targets such as devices (e.g., desktop and laptop computer, tablet computer, mobile phone), placements (e.g., desktop and laptop web page, mobile web page, mobile application), domains (e.g., web domains, mobile applications, websites), user geographic areas, or user systems (e.g., carriers, operating systems, browsers, devices). Other line item targets are possible. A line item can also include on or more creatives.

Each advertising campaign of a line item includes a set of creatives that promote an idea, theme, product, or brand (e.g., a children's brand, a healthy lifestyle, a new car model). Similarly to a line item, an advertising campaign can include flight dates and a budget. An advertising campaign also includes one or more payment types (e.g., CPC, CPM, CPA) and bidding instructions (e.g., a bid price) on ad inventories, and one or more creatives. An advertising campaign can also include targets in devices, placements, domains, user geographic areas, user systems. An advertising campaign can have more granular controls in targeting than a line item, such as targets in inventory segments (e.g., automobiles, home and garden, sports), publishers, and user segments (e.g., demographics). Other advertising campaign targets are possible.

In some implementations, a line item may have precedence over its advertising campaigns. For instance, an advertising campaign cannot bid after its parent line item's flight dates had expired. In some other implementations, an advertising campaign may have precedence over its parent line item. For instance, if an advertising campaign's user target geographic area is smaller than but is part of the user target geographic area of its parent line item, the advertising campaign will bid only within its own user target geographic area. In yet some other implementations, an aggregation of targets or creatives of a line item and its advertising campaigns can be used to bid on an auction element or ad inventory.

A buyer can submit a line item including one or more advertising campaigns to the server system 122 through a line item application program interface (API), causing the server system 122 (e.g., a bidder software) to store the line item in the bid data store database 136. The advertising element updater 164 can identify new line items by listening to the line item API, or periodically checking the bid data store database 136 for new line items.

A bid price for a particular creative of a line item representing a buyer can be determined by the buyer when the line item is created and entered into the server system 122 (e.g., via the advertising element updater 164). However, bid prices for creatives of a line item may not be fixed numbers at the time when the line item is created.

For instance, a line item representing a buyer can be created by a bidding ad network that acts for the buyer in bidding for ad spaces. The bidding ad network may not know, at the time the line item is created, an exact bid price that the buyer is willing to pay for an ad space. For instance, the bidding ad network (e.g., a bidder software bidding on behalf of the bidding ad network) may only know how much the buyer is willing to bid for an ad space by accessing the buyer's ad server, when the ad space is being auctioned in real time by the transaction manager 112.

In order to acting for a buyer, the bidding ad network can create a line item representing the buyer and including a bid price for creatives of the line item based on the buyer's historical performance. For instance, the bidding ad network (e.g., via the advertising element updater 164 or another software component of the server system 122) can access the transaction data store database 134 for past revenue generated by the buyer—e.g., past winning bid prices of impressions served (won) by creatives of the buyer. The bidding ad network can determine an estimated bid price based on the past revenue generated by the buyer. For instance, the bidding ad network can determine an estimated bid price (e.g., for all creatives of the line item) using an average winning (or paid) bid price of impressions served by creatives of the buyer in the past 30 days. Other examples of determining an estimate bid price based on past revenue generated by the buyer are possible. The bidding ad network can also determine the estimated bid price based on a particular creative. The bidding ad network can also determine the estimated bid price based on target attributes such as user geographic areas, placements, domains, devices, and so on.

Figure 2:
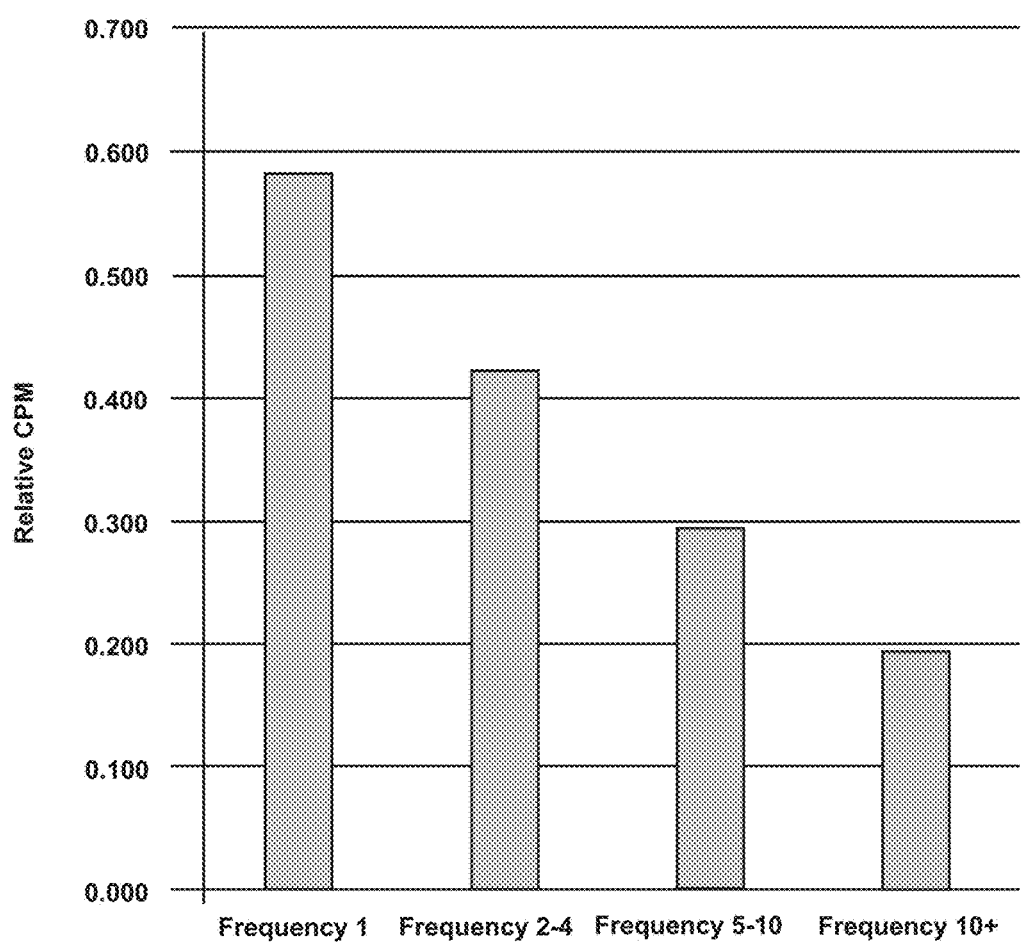
FIG. 2 is a bar chart illustrating an example relationship between average winning bid prices and user impression frequency for an ad network.

FIG. 2. is a bar chart illustrating an example relationship between average winning bid prices and user impression frequency for an ad network. In FIG. 2, "relative CPM" represents the average winning bid prices that the ad network paid for impressions. The average winning bid prices are grouped into different frequency "buckets." Each frequency bucket represents a range of daily user impression frequency in how many times (impressions) a same creative (or a same set of creatives) from the ad network was served to a same user during a day. For instance, the bar "Frequency 1" represents the average winning bid price for daily user impression frequency of one (one impression of a particular creative per day for a same user). The bar "Frequency 2-4" represents the average winning bid price for daily user impression frequency between two and four (two to four impressions of a particular creative per day for a same user As illustrated in FIG. 2, the average winning bid price generally decreases with higher user impression frequency, FIG. 2 illustrates that a buyer can bid less for an ad space associated with a user if one or more creatives from the buyer have been served to the user during a short period of time (e.g., during past 24 hours). The buyer can bid less because, for example, the user may become less engaged with the buyer's advertising from multiple exposures (to the buyer's advertising) and is less likely to take further actions that the buyer desires, such as a click a click-through event after an impression. Here, a click event by the user after seeing an impression of the buyer's advertising can indicate the buyer's own web content (e.g., a landing page for the click event) is consumed by the user. A click-through event can be an action by the user after a click event. For instance, the user can take actions such as joining a mailing list, creating an account, completing a survey, purchasing an item, saving an item to a wish list, sharing content on a landing page to a friend, subscribing to a web feed, and so on.

To account for a lower bid price for an ad space with a higher user impression frequency, particular implementations described in this specification adjust a bid price of a line item based on user impression frequency. Particular implementations apply an impression frequency modifier to the bid price when bidding for an available ad space. More particularly, an impression frequency modifier can be applied to estimated bid prices based on past revenue of a line item, as further described below.

The transaction manager 112 (or another software component of the server system 122) can construct a set of impression frequency modifiers that models the relationship between bid prices and user impression frequency for a buyer such as an ad network. The transaction manager 112 can construct the set of impression frequency modifiers based on past transaction information for the ad network. For instance, the transaction manager 112 can access the transaction data store database 134 and determine, for each impression served (won) by a creative from the ad network in the past month, a corresponding time stamp, user identifier, and winning bid price. The transaction manager 112 can determine a daily user impression frequency for each impression (e.g., based on a corresponding user identifier), aggregate the impressions into frequency buckets, and determine a relationship between average bid prices of the impressions and user impression frequency for the ad network, such as the bar chart in FIG. 2.

The transaction manager 112 can determine a set of impression frequency modifiers that models the relationship between bid prices and user impression frequency for the ad network, and store the set of impression frequency modifiers in the bid data store database 136. By way of illustration, the set of impression frequency modifiers can be derived using least square regression. Other example methods for deriving the set of impression frequency modifiers are possible. Here, assume that user frequencies that are sent to the ad network are capped (e.g., at 30). Let t denote time interval between 1 to T. Let $y_t$ denote the average revenue per impression during the time interval t by the ad network. Let $x_{a-b,t}$ denote the proportion of impressions of user frequency range from a to b (inclusively) during the time interval t as recorded by the transaction manager 112. Let $x_{c-d,t}$ denote the proportion of impressions of user frequency range from c to d (inclusively) during the time interval t as recorded by the transaction manager 112. Let $x_{e-f,t}$ denote the proportion of impressions of user frequency range from e to f (inclusively) during the time interval t as recorded by the transaction manager 112. Let $x_{g,t}$ denote the proportion of impressions of user frequency range greater than g (inclusively) during the time interval t as recorded by the transaction manager 112. And let $p_t = \beta_0 x_{a-b,t} + \beta_1 x_{c-d,t} + \beta_2 x_{e-f,t} + \beta_3 x_{g,t}$. The set of impression frequency modifiers then can be values of $\beta_0$, $\beta_1$, $\beta_2$, and $\beta_3$ that minimize the sum of the squared difference between all $p_t$ and $y_t$. These $\beta$ values can be found using gradient decent or matrix algebra, for example.

For instance, the set of frequency modifiers can be as follows:

| Daily impression frequency | Frequency modifier |
|---|---|
| 1 | 1.31 |
| 2-7 | 1.05 |
| 8-18 | 0.85 |
| 19+ | 0.70 |

The set of frequency modifiers above are normalized such that the weighted average of the frequency modifiers is one. The set of frequency modifiers can be used to adjust bid prices by the ad network (or for another ad network or advertiser), as further described in more detail in reference to FIG. 3.

Figure 3:
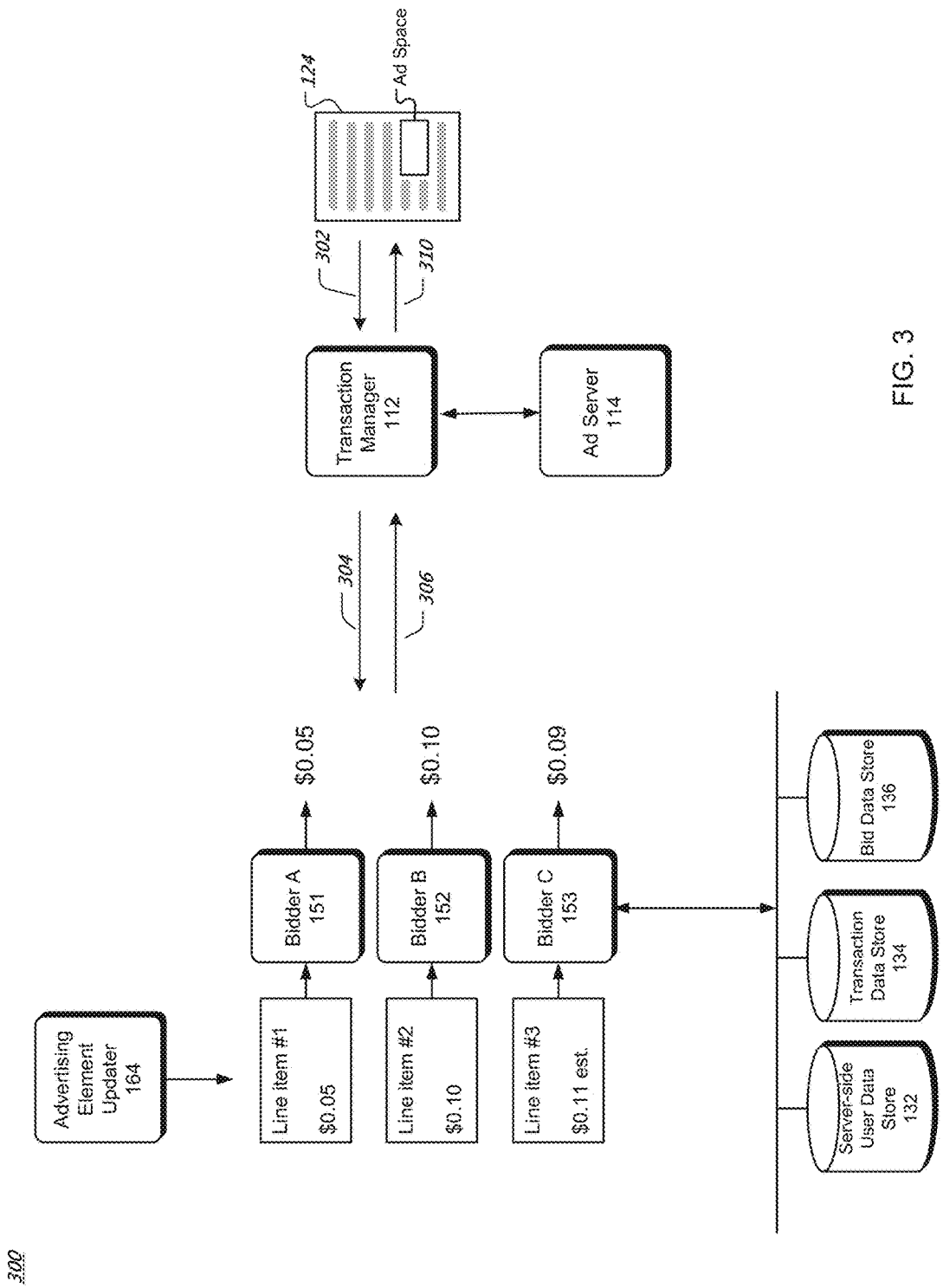
FIG. 3 is a data flow diagram for an example method for adjusting bid prices for display advertising auctions based on user impression frequency.

FIG. 3 is a data flow diagram of an example method for adjusting bid prices for display advertising auctions based on user impression frequency. In FIG. 3, the transaction manager 112 receives an ad request (302) indicating an available ad space in the user interface 124 of the application running on the user's client device 120. The user can be identified by the user's identifier included in the ad request. The transaction manager 112 can request for bidding for the ad space by sending a bid request (304) to bidders in the server system 122 (or external to the server system 122). Each bidder (e.g., bidder A, bidder B, bidder C) can bid on behalf of a respective line item (e.g., line item #1, line item #2, line item 190 3). The line items can be obtained by the advertising element updater 164 or stored in the bid data store database 136 as described earlier.

Here, let the line items #1 and #2 have bid prices ($0.05 and $0.10, respectively) that are determined and fixed at the time the line items are created, Let the line item #3 have a bid price ($0.11) that is estimated based on past revenue generated from the buyer represented by the line item as described earlier.

The bidders can submit bids to the transaction manager 112 based on bid prices specified by their respective line items (306). For instance, the bidder A can submit a bid with a bid price $0.05 as specified by the line item #1. The bidder B can submit a bid with a bid price $0.10 as specified by the line item #2. Instead of submitting a bid with an estimated bid price $0.11 as specified by the line item #3, the bidder C can adjust the estimated bid price $0.11 based on an impression frequency associated with the user. The bidder C can determine an impression frequency for the user by accessing (e.g., based on the user's identifier included in the bid request 304) the transaction data store database 134 and determine a number of impressions served to the user by one or more creative of the line item #3 during a past predetermined time period—e.g., during the past 24 hours. Based on the number of impressions in the past 24 hours (i.e., the daily impression frequency), the bidder C can access the bid data store database 136 for a frequency modifier for the line item's buyer. For instance, if the daily impression frequency is 9 (i.e., 9 impressions served to the user by one or more creative of the line item #3 in the past 24 hours), the corresponding frequency modifier is 0.85 from the example set of frequency modifiers described earlier.

The bidder C can adjust the estimated bid price $0.11 based on the daily impression frequency by multiplying the estimated bid price $0.11 with the corresponding frequency modifier 0.85, resulting a bid price of $0.09. The bidder C can submit the adjusted bid price $0.09 to the transaction manager 112.

The transaction manager 112 can rank the bid prices submitted by the bidders. For the top-ranked bid—e.g., $0.10 from the bidder B, the transaction manager 112 can identify a creative of the line item #2 (e.g., via the ad server 114) and send the creative the user's client device 120 to be displayed in the ad space in the user interface 124. The creative can be a visual advertisement. The creative can also be an URL to a visual advertisement stored at a remote ad server of the buyer represented by the line item #2. The application on the user's client device 124 or the transaction manager 112 can retrieve the visual advertisement based on the URL.

If the transaction manager 112 cannot obtain a creative of the line item #2 (e.g., because an ad server of the buyer represented by the line item #2 did not respond), the transaction manager 112 can identify another creative from the second-ranked line item (e.g., the line item #3 with the adjusted bid price $0.09), and provide the creative to the user's client device 120, causing the application to display the creative in the ad space in the user interface 124.

If the transaction manager 112 cannot obtain a creative of the line item #3 (e.g., because an ad server of the buyer represented by the line item #3 did not respond, or responded with an indication that no creative was provided), the transaction manager 112 can identify another creative from the next-ranked line item (e.g., the line item #1 with the bid price $0.05). The transaction manager 112 can provide the creative of the next-ranked line item to the user's client device 120, causing the application to display the creative in the ad space in the user interface 124.

The transaction manager 112 can continue identify another creative from a next-ranked item until a creative is sent to the user's client device 120, or until a specified time period (e.g., 300 milliseconds) has expired.

Figure 4:
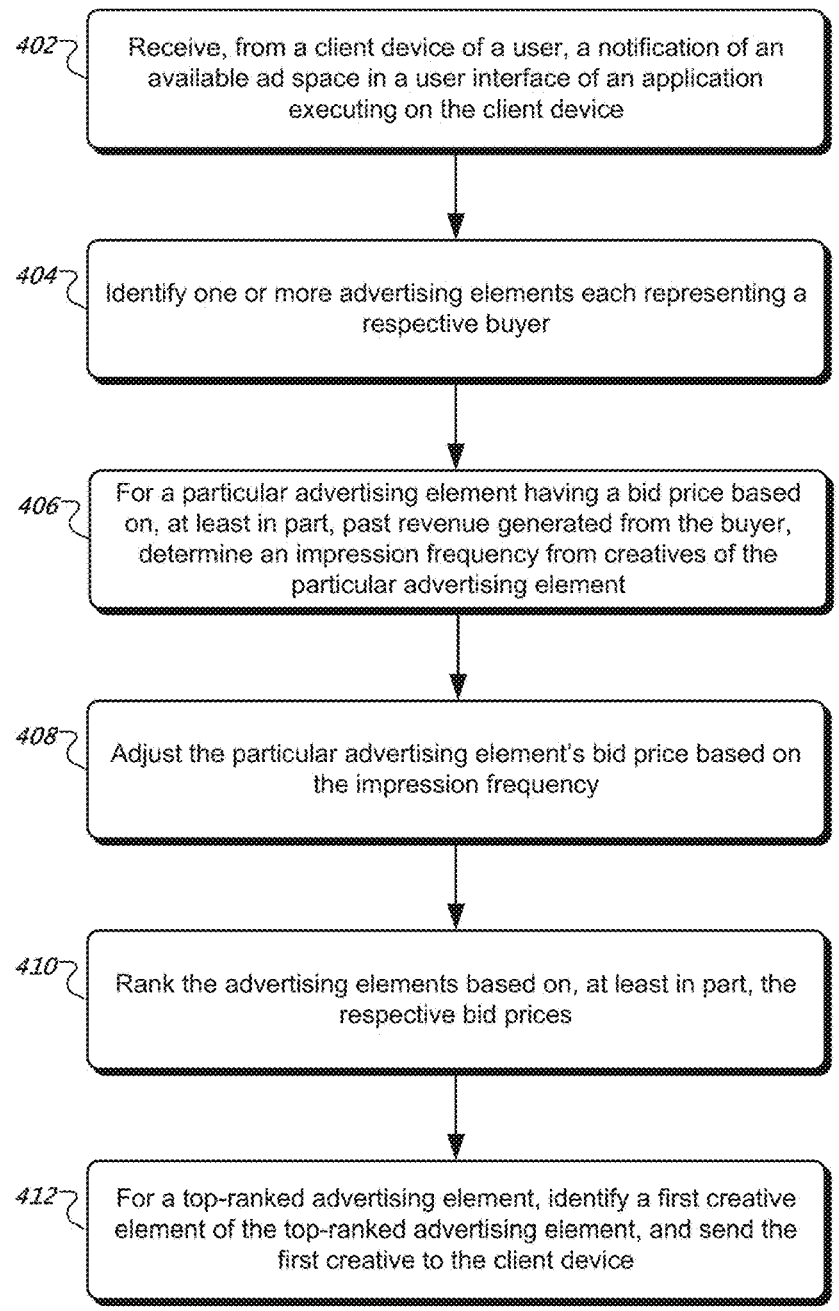
FIG. 4 is a flowchart of an example method for adjusting bid prices for display advertising auctions based on user impression frequency.

FIG. 4 is a flowchart of an example method for adjusting bid prices for display advertising auctions based on user impression frequency. The method can be implemented using software components executing on one or more data processing apparatus that are part of the data center 121 described earlier. The method begins by receiving, from a client device of a user, a notification of an available ad space in a user interface of an application executing on the client device (402). The method identifies one or more advertising elements, each advertising element representing a respective buyer and comprising a respective bid price, one or more respective campaigns, and one or more respective creative elements (404). For a particular advertising element having a bid price based on, at least in part, past revenue generated from the buyer, the method determines an impression frequency from one or more of the creative elements of the particular advertising element (406), and adjusts the particular advertising element's bid price based on the impression frequency (408). After adjusting the particular advertising element's bid price, the method ranks the advertising elements based on, at least in part, the respective bid prices (410). For a top-ranked advertising element, the method identifies a first creative element of the top-ranked advertising element, and sends the first creative element to the client device (412).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single tile dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e,g., a mobile telephone, a personal digital assistant (PDA), mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser. implementations of the subject matter described in this specification can be implemented in a computing system that includes aback-end component, e,g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation.

Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or, sequential order, to achieve desirable results. In certain implementations, multitasking and parallel processing may be advantageous.

What is claimed is:

1. A method comprising:

receiving over a network, at a physical server system deployed at a data center, from a client device of a user, a notification of an available ad space in a user interface of an application executing on the client device, wherein the physical server system comprises hardware and software components configured to provide a real-time bidding platform for online advertisements;

initiating, by the physical server system, a real-time auction for the available ad space by identifying one or more line items, each line item representing a respective buyer and comprising a respective bid price resulting in a plurality of respective bid prices, one or more respective campaigns, and one or more respective identifiers of creatives, wherein the client device determines an impression frequency by recording a number of times a creative is displayed to the user over a time interval, wherein the client device provides the impression frequency to the physical server system;

detecting, by the physical server system, the impression frequency from one or more of the identifiers of the creatives of a particular line item;

calculating a plurality of impression frequency modifiers for the time interval, wherein each impression frequency modifier corresponds to a bucket of a group of buckets of possible impression frequencies occurring over the time interval;

determining that the impression frequency falls into a first bucket of the group of buckets;

adjusting, by the physical server system, a particular line item's bid price based on the impression frequency by multiplying the particular line item's bid price by an impression frequency modifier that corresponds to the first bucket;

responsive to adjusting the particular line item's bid price, ranking, by the physical server system, the line items based on the plurality of respective bid prices; and identifying, by the physical server system, a first identifier of the creative of a top-ranked line item;

identifying, by the physical server system, a device type for the client device;

identifying, by the physical server system, compatible target device types from the top-ranked line item;

determining, by the physical server system, the device type for the client device is one of the compatible target device types according to the top-ranked line item; and transmitting, by the physical server system, the first identifier of the creative to the client device, wherein the client device obtains the creative from an ad server over a computer network according to the first identifier of the creative, wherein the client device obtains a web page from a web server over the computer network, wherein the web page comprises the available ad space, wherein the client device displays the creative in the available ad space.

2. The method of claim 1, wherein the detecting the impression frequency comprises receiving, by the physical server system, the impression frequency from the client device.

3. The method of claim 1, wherein the first identifier of the creative causes the application to retrieve, from a remote server system of the respective buyer, a second identifier of the creative and display the creative corresponding to the second identifier of the creative in the available ad space.

4. The method of claim 3, wherein the first identifier of the creative comprises JavaScript Object Notation (JSON) code.

5. The method of claim 3, wherein the first identifier of the creative comprises a Uniform Resource Locator (URL) of the remote server system of the respective buyer.

6. The method of claim 1, wherein the identifying the first identifier of the creative of the top-ranked line item comprises retrieving the first identifier of the creative from a remote server system of the respective buyer.

7. The method of claim 1, comprising identifying, for a next top-ranked line item, a second identifier of the creative of the next top-ranked line item and sending the second identifier of the creative of the next top-ranked line item to the client device when the first identifier of the creative is not identified for the top-ranked line item.

8. A system comprising:
a memory to store computer instructions; and
a processor coupled with the memory, wherein the processor, responsive to executing the computer instructions, performs operations, the operations comprising:
receiving over a network from a client device of a user, a notification of an available ad space in a user interface of an application executing on the client device;
initiating a real-time auction for the available ad space by identifying one or more line items, each line item representing a respective buyer and comprising a respective bid price resulting in a plurality of respective bid prices, one or more respective campaigns, and one or more respective identifiers of creatives, wherein the client device determines an impression frequency by recording a number of times a creative is displayed to the user over a time interval, wherein the client device provides impression frequency to the system;

detecting the impression frequency from one or more of identifiers of the creative of a particular line item;

calculating a plurality of impression frequency modifiers for the time interval, wherein each impression frequency modifier corresponds to a bucket of a group of buckets of possible impression frequencies occurring over the time interval;

determining that the impression frequency falls into a first bucket one of the group of buckets;

adjusting a particular line item's bid price based on the impression frequency by multiplying the particular line item's bid price by an impression frequency modifier that corresponds to the first bucket;

responsive to adjusting the particular line item's bid price, ranking, by system, the line items based on the plurality of respective bid prices; and identifying, a first identifier of the creative of a top-ranked line item;

identifying a device type for the client device;

identifying compatible target device types from the top-ranked line item;

determining the device type for the client device is one of the compatible target device types according to the top-ranked line item; and transmitting, by the, the first identifier of the creative to the client device, wherein the client device obtains the creative from an ad server over a computer network according to the first identifier of the creative, wherein the client device obtains a web page from a web server over the computer network, wherein the web page comprises the available ad space, wherein the client device displays the creative in the available ad space.

9. The system of claim 8, wherein the detecting the impression frequency comprises receiving the impression frequency from the client device.

10. The system of claim 8, wherein the first identifier of the creative causes the application to retrieve, from a remote server system of the respective buyer, a second identifier of the creative and display the creative corresponding to the second identifier of the creative in the available ad space.

11. The system claim 10, wherein the first identifier of the creative comprises JavaScript Object Notation (JSON) code.

12. The system of claim 10, wherein the first identifier of the creative comprises a Uniform Resource Locator (URL) of the remote server system of the respective buyer.

13. The system of claim 8, wherein the identifying the first identifier of the creative of the top-ranked line item, comprises retrieving the first identifier of the creative from a remote server system of the respective buyer.

14. The system of claim 8, wherein the operations comprise identifying, for a next top-ranked line item, a second identifier of the creative of the next top-ranked line item and sending the second identifier of the creative of the next top-ranked line item to the client device when the first identifier of the creative is not identified for the top-ranked line item.

15. A non-transitory, machine-readable storage medium, comprising executable instructions that, when executed by a processing system including a processor, facilitate performance of operations, comprising:

receiving over a network from a client device of a user, a notification of an available ad space in a user interface of an application executing on the client device;

initiating a real-time auction for the available ad space by identifying one or more line items, each representing a respective buyer and comprising a respective bid price resulting in a plurality of respective bid prices, one or more respective campaigns, and one or more respective identifiers of creatives, wherein the client device determines an impression frequency by recording a number of times a creative is displayed to the user over a time interval, wherein the client device provides impression frequency to the processing system;

detecting the impression frequency from one or more of identifiers of the creative of a particular line item, wherein the impression frequency comprises a number of impressions served to the user over the time interval for the one or more of the identifiers of the creative, calculating a plurality of impression frequency modifiers for the time interval, wherein each impression frequency modifier corresponds to a bucket of a group of buckets of possible impression frequencies occurring over the time interval;

determining that the impression frequency falls into a first bucket of the group of buckets;

adjusting a particular line item's bid price based on the impression frequency by multiplying the particular line item's bid price by an impression frequency modifier that corresponds to the first bucket;

responsive to adjusting the particular line item's bid price, ranking based on, the plurality of respective bid prices; and identifying a first identifier of the creative of a top-ranked line item;

identifying a device type for the client device;

identifying compatible target device types from the top-ranked line item;

determining the device type for the client device is one of the compatible target device types according to the top-ranked line item; and transmitting the first identifier of the creative should be sent to the client device, wherein the client device obtains the creative from an ad server over a computer network according to the first identifier of the creative, wherein the client device obtains a web page from a web server over the computer network, wherein the web page comprises the available ad space, wherein the client device displays the creative in the available ad space.

16. The non-transitory, machine-readable storage medium of claim 15, the detecting the impression frequency comprises receiving the impression frequency from the client device.

17. The non-transitory, machine-readable storage medium of claim 15, wherein the first identifier of the creative causes the application to retrieve, from a remote server system of the respective buyer, a second identifier of the creative and display the creative corresponding to the second identifier of the creative in the available ad space.

18. The non-transitory, machine-readable storage medium of claim 17, wherein the first identifier of the creative comprises JavaScript Object Notation (JSON) code.

19. The non-transitory, machine-readable storage medium of claim 17, wherein the first identifier of the creative comprises a Uniform Resource Locator (URL) of the remote server system of the respective buyer.

20. The non-transitory, machine-readable storage medium of claim 15, wherein the identifying of the first identifier of the creative of the top-ranked line item, comprises retrieving the first identifier of the creative from a remote server system of the respective buyer.

21. The non-transitory, machine-readable storage medium of claim 15, wherein the operations comprise identifying, for a next top-ranked line item, a second identifier of the creative of the next top-ranked line item and sending the second identifier of the creative of the next top-ranked line item to the client device when the first identifier of the creative is not identified for the top-ranked line item.

* * * * *